United States Patent Office 3,384,753
Patented May 21, 1968

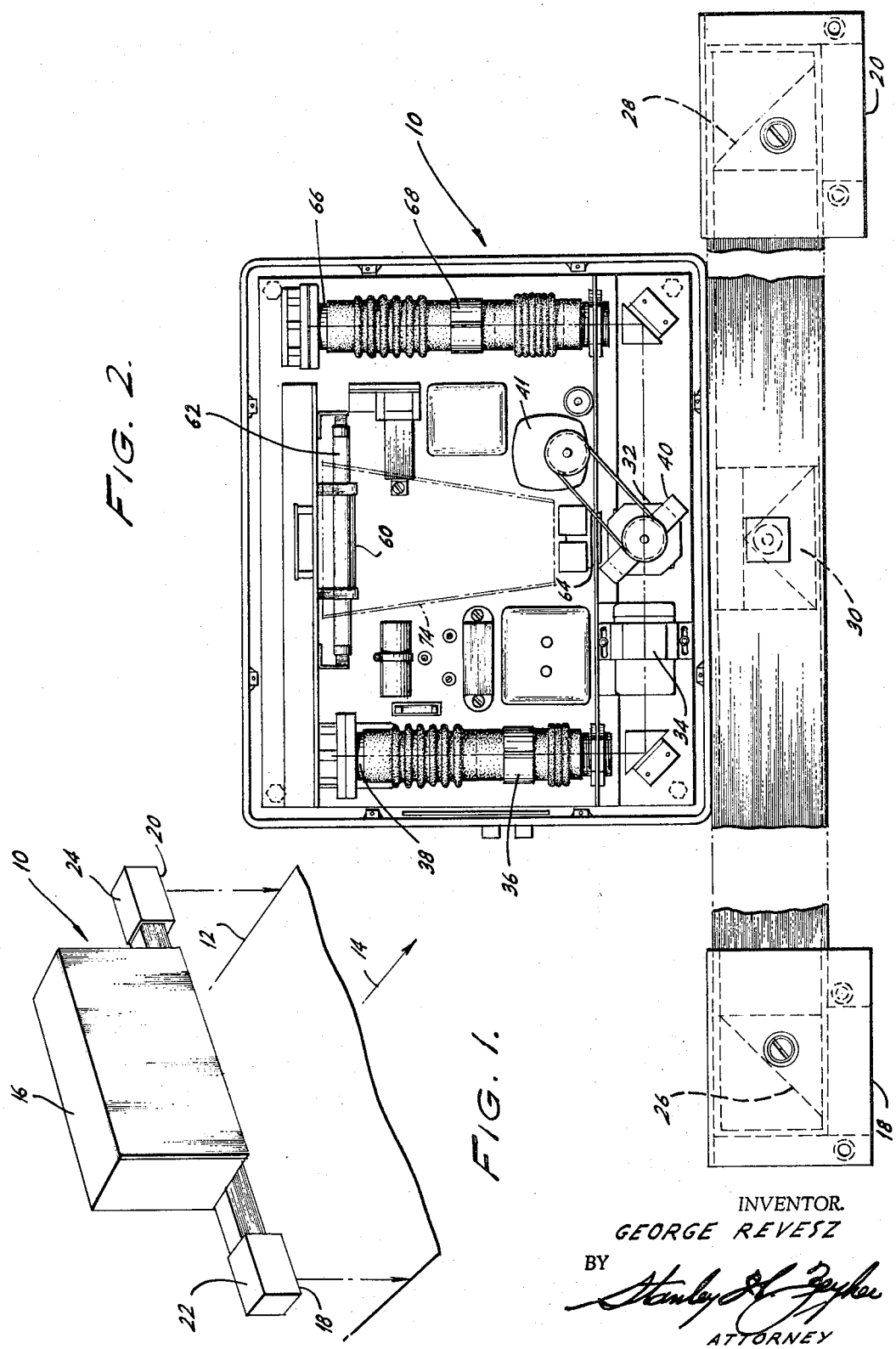

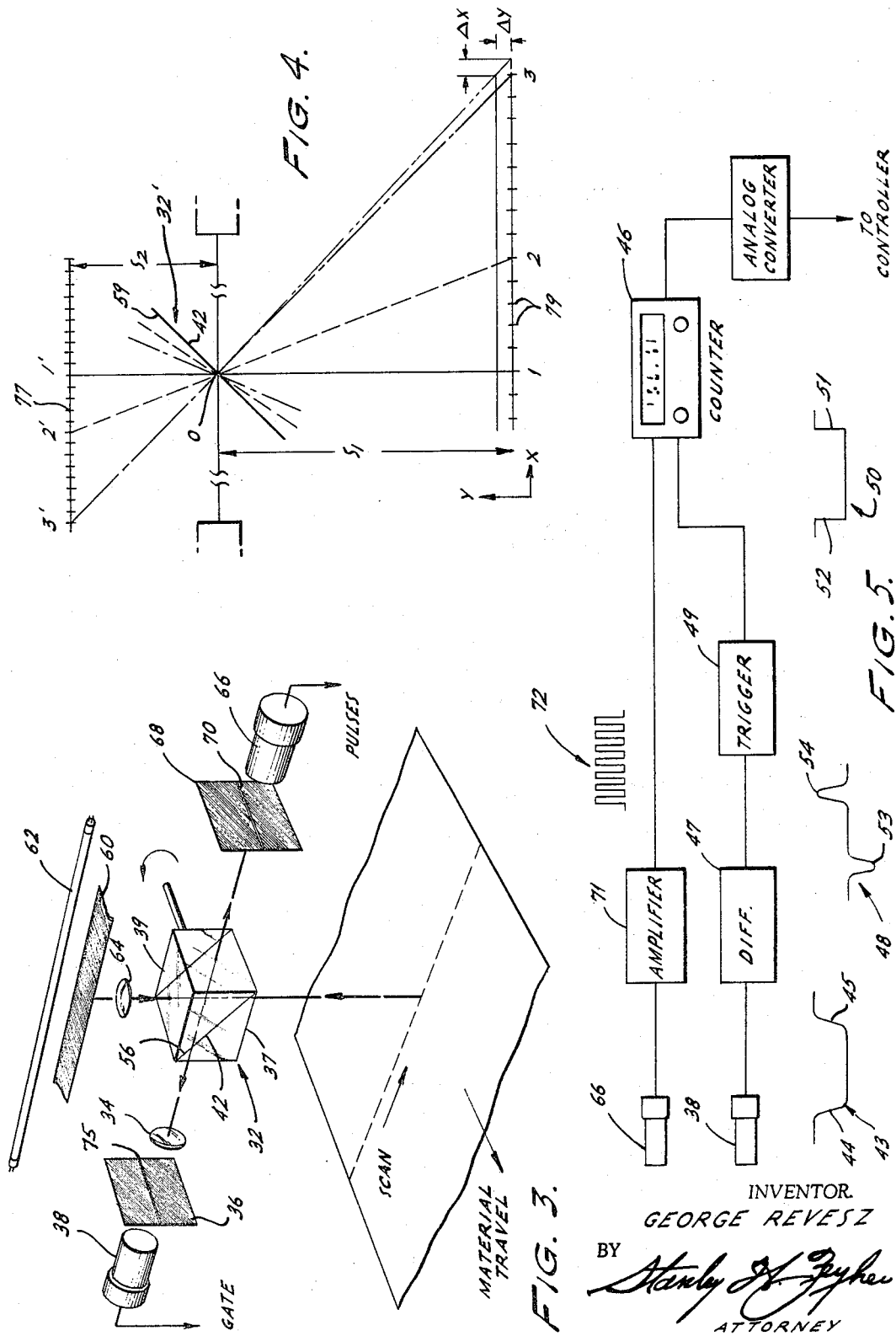

3,384,753
PHOTOSENSITIVE MEANS FOR MEASURING A DIMENSION OF AN OBJECT
George Revesz, Bala Cynwyd, Pa., assignor to Philco-Ford Corporation, a corporation of Delaware
Filed Feb. 1, 1965, Ser. No. 429,488
9 Claims. (Cl. 250—219)

ABSTRACT OF THE DISCLOSURE

Electro-optical scanning means for detecting radiation signals indicative of the ends of an object are used to measure a dimension of the object. A train of discrete signals is generated throughout a scanning traverse in such a manner as to insure a fixed ratio between the number of pulses generated during the traverse and the distance scanned.

---

This invention relates to dimensional measuring apparatus and more particularly to novel and improved means permitting remote, non-contact measurement of both stationary and moving objects.

There are numerous applications which do not admit of contact measurement of an object being processed, but in which continuous monitoring of the dimensions of the object is desirable if improved yields are to be obtained. Exemplary of such applications are the continuous extrusion of hot glass tubing and the hot rolling of steel strip, glass, and similar materials.

One current approach to the problem is to employ some form of remotely located rotary scanning device which in association with discontinuities existing between the object and its surroundings, generates signals indicative of end positions of the dimension being measured. The magnitude of the dimension is then assumed to be proportional to the elapsed scanning time between detected radiation discontinuities.

In such devices it is common practice to employ an oscillator for pulse generation to provide an indication of the magnitude of the dimension being measured, reliance being placed on the existence of a fixed proportionality between the scanning period and the number of pulses generated during a given measurement period.

For reliable measurement it is essential that the number of pulses in a given scan period be invariant and hence that the oscillator used for generating the pulses be extremely stable. To insure the required stability, resort must be had to complex and costly auxiliary circuits which guarantee precise oscillator synchronization with scan.

It has been found, however, that successive scans of the same dimension are often not productive of identical results because of parallax introduced by movement of the object in the direction of scan. This problem can be appreciated when it is realized that the linear length traversed in a given period of time by a rotary scanning device moving at a fixed rotational velocity increases as the distance from the scanning axis increases. If the position of the object changes in the direction of scan the parallax caused by such movement introduces an error which renders the measurement unreliable.

Accordingly, it is a general object of the invention to provide a simplified and reliable measurement device permitting remote, non-contact measurement of objects, which device overcomes the limitations and deficiencies of the prior art.

It is another object of the invention to provide a measuring device which obviates the need for using oscillator pulse generation and problems attendant such use.

A still further and more particular object of the invention is the provision of a measuring device which is self correcting for parallax error.

The above mentioned and other objects within contemplation will be more readily understood by reference to the accompanying detailed description and drawings, in which:

FIGURE 1 is a perspective showing of apparatus embodying the present invention;

FIGURE 2 is an enlarged, partially sectionalized elevation of the apparatus shown in FIGURE 1;

FIGURE 3 is a schematic representation of a preferred form of the invention;

FIGURE 4 is a diagram of the apparatus shown in FIGURE 3 illustrating the geometric relationship between the pulse generating and scanning portions of the apparatus; and FIGURE 5 is a schematic diagram of one form of electrical circuit useable in practice of the invention.

In accomplishment of the foregoing and other objectives there is provided measuring apparatus incorporating means for automatically compensating for conditions of parallax. The apparatus includes scanning means for detecting radiation discontinuities indicative of end positions of the dimension being measured, acting in cooperation with electro-optical means for generating a train of discrete signals throughout the measurement traverse. In accordance with the invention the scanning and pulse generating portions of the device are so interrelated as to insure a fixed ratio between the number of pulses generated during a measurement traverse and the linear length scanned, independent of the traversing period.

The total number of pulses generated during a measurement scan may be electronically counted by means well known in the art to provide an accurate indication of the magnitude of the dimension being measured. To insure a fixed proportionality between the linear length scanned and the number of pulses generated during that scan both functions are made mechanically interdependent. The preferred means for accomplishing this objective is described below.

In FIGURE 1 the invention is shown embodied in measuring apparatus 10 used in the width measurement of a moving strip of hot steel 12. In this illustration the object undergoing measurement is incandescent and is readily distinguishable from its background without the need for artificial illumination. In those instances in which the object being measured is not self-radiant some form of external illumination may be employed to permit the object to be distinguished from its background. Techniques which can be used, for example, are to back-light an opaque, nonradiant object or to use reflected radiation if the surface being measured admits of such treatment.

While an important field of utility of the present invention is in the measurement of steel strip it has application to the measurement of any object which can be distinguished from its background.

As seen in FIGURE 1, strip 12, the width dimension of which is to be continuously monitored, is traveling at a relatively high rate of speed in the direction indicated by arrow 14. As the steel sheet passes under the measuring device, radiation emanating from the sheet is received by the device through scanning ports 18 and 20 provided in outriggers 22 and 24.

Constructional details of the apparatus are shown in FIGURE 2. The scanning ports 18 and 20 are each equipped with a 45° prism 26 and 28, to reflect incident radiation toward a fixed centrally located prism 30. Radiation reflected from this latter prism is intercepted by a rotatable scanning head 32 and imaged by a biconvex lens 34 through a horizontally slitted stop 36 onto photomultiplier tube 38. The head 32 may be constructed of any reflective material, but preferably is made of a pair of 45° prisms 37 and 39 (FIGURE 3) held in abutting relation by yoke member 40, as seen in FIGURE 2. To provide a suitable scanning rate the head 32 is belt driven by an 1800 r.p.m. synchronous motor 41 geared to provide a drive speed of approximately 200 revolutions per minute. Radiation incident on the downwardly presented surface of face 42 of prism 37 is reflected, throughout the scanning traverse, onto photomultiplier 38 and results in generation of the output wave 43 (FIGURE 5). The sloped sides 44 and 45 of the wave correspond to radiation discontinuities and signify end positions of the dimension being scanned. This wave, after suitable electronic processing, is used to control operation of counter 46 in the manner hereinafter described.

One preferred arrangement is to apply the photomultiplier output 43 to a differentiator 47 the output 48 of which is fed to a trigger circuit 49 whose output 50 is used to activate the pulse counter 46.

Differentiator 47 includes one or more reactive circuit elements, its output 48 being approximately the first derivative of the input wave 43. The output of the differentiator has an amplitude which corresponds to the rate of change of the input wave. This result may be achieved, for example, by connecting an amplifier tube to respond to the voltage drop across an inductive circuit element, in which case the voltage drop is in direct proportion to the rate of change of current flow through the inductance. Capacitive circuit elements may also be used, the instantaneous charging current of the condenser being in direct proportion to the rate of change of a potential applied to its terminals.

Differentiation of wave 43 produces waveform 48 consisting of a negative pip 53 and a positive pip 54. These pips are applied to the amplitude trigger 48 which produces an output 50 of substantially rectangular wave shape. This wave in turn is used to energize electronic counter mechanism 46 for the time period between radiation discontinuities. The leading edge 51 of the electrical wave 50 is used to turn on the counter mechanism 46 and the trailing edge 52 of the wave is used to turn the counter off.

During the measurement interval defined by the width of waveform 50, reflecting surface 56 of the second of the two prisms comprising the composite scanning head 32, is caused to scan a grating 60 irradiated by a six watt neon tube 62. In the illustrated embodiment the frequency of the grating is 250 lines per inch. As the grating 60 is scanned on rotation of reflecting surface 56, a train of discrete light pulses is generated. These pulses, or light signals, are focused by lens 64 onto the cathode of photomultiplier 66 through a horizontally apertured stop 68 for transduction into electrical signals. These electrical pulses, after suitable and known electronic processing, are summed by counter 46 during the measurement interval to provide an accurate indication of the linear distance scanned. The function of lens 64 is to produce a sharp image of the grating in the plane of the apertured stop 68. Without the lens the image is too diffuse. Rotation of prism 39 progresively images different portions of the grating in the stop window 70 so that the photosensor 66 alternately views pulses of light spaced by interposed periods of darkness.

To insure generation of clean electrical pulses stop 68 is provided with a horizontal slit 70 the width of which is made as narrow as possible consistent with required signal strength. When the slit width is equal or smaller than the width of one bar of the grating 60 the output 72 of photomultiplier 66 is in the form of a train of discrete, uniform pulses. If the slit width corresponds to the width of a larger odd number of bars, then it is necessary to include in the processing circuits differentiating means to permit the counting circuit to respond to the leading or trailing edge of the signal, the other edge being eliminated. The use of a slit width corresponding to one bar of the grating permits simplified processing and counting circuits. In either event the accuracy of the system is unaffected. In the optical arrangement illustrated in FIGURE 2 a satisfactory compromise between sharpness of signal and light output, using a 250 line per inch grating illuminated by a 6 watt, 110 volt neon tube, was achieved by employing a slit width of one mil. To avoid cross-channel light interference and to shield grating 60 from dust or moisture a light funnel 74 is used. For optimum results photomultiplier 66 is selected to have a spectral-sensitivity characteristic correlated to the emission characteristic of the neon tube 60.

To provide comparable sensitivity of the edge detecting portions of the system, stop 36 also is provided with a one mil wide horizontal slit 75. When measuring the width of an object such as an incandescent sheet of steel 12 a photosensor having a spectral-sensitivity in the infrared range is employed.

To provide satisfactory drive of electronic counter 46 the output of photomultiplier 66 is fed through amplifier 71. The resulting amplifier train of pulses 72 is then used during energization of counter 46 by waveform 50, to provide an accurate measurement of the width dimension of sheet 12 in known manner.

As previously noted, movement of sheet 12 transverse its direction of travel produces a condition referred to as parallax. By the arrangement described, any error normally introduced by such movement is automatically compensated for by utilizing essentially the same surface, i.e., surfaces 42 and 56 of prisms 37 and 39 respectively, for both pulse generating and gating functions. A plane mirror the opposed faces of which are reflective may also be used as well as other mechanical variants. The important criterion of performance is that the means for performing the functions of gating and pulse generation be productive of movements which have a fixed proportionality.

To better demonstrate the interrelationship achieved by the illustrated construction, reference should be had to FIGURE 4. As shown graphically in that figure the number of pulses generated during a given scanning interval has a fixed proportionality to the length of the scanning trace. Comparing, for example, the difference in the linear length of the scanning trace between positions 1 and 2, and between positions 2 and 3 it will be seen that the associated number of grating positions—indicated by markings 77—scanned by the back surface 59 of the reflector 32' is in direct proportion to the linear length traversed by surface 42 during the forward scan as indicated by markings 79. This is readily verifiable by comparison of similar triangles 1, 0, 2 and 1', 0, 2' and similar triangles 2, 0, 3 and 2', 0, 3'. Such comparison discloses that the pulse generating scans and the gating scan are in fixed proportion defined by the ratio $S_1/S_2$. By this arrangement any error caused by dislocation of sheet 12 in the direction of scan, which in FIGURE 4 is assumed to be in the X direction, will be compensated for automatically. For example, any variation in the linear distance scanned during a given interval of time as a result of transverse displacement is compensated for automatically by a corresponding variation in the linear distance scanned by the pulse generating portions of the system. More specifically, if 5 markings 79 are scanned on the forward sweep between positions 1 and 2, the back surface of the scanning head scans 5 markings 77. If because of transverse displacement of sheet 12 the linear distance scanned during the same interval of time as, for example, the distance scanned between positions 2 and 3, is 8 markings, the back surface scans a correspondingly greater number of markings.

As previously noted, it has been the prior art practice to assume that the dimension being measured is proportional to the scan period. It will be seen, referring to FIGURE 4 and assuming constant angular velocity of reflector 32', that the linear distance scanned per unit time is dependent on the position of the object relative to the rotational axis "0." By resort to the present invention, this position dependency is eliminated.

Another advantageous feature of the present invention is the precision of measurement, or resolving power, which is obtainable. Additionally, the resolution capabilities of instruments embodying the present invention are readily adjustable to accommodate varying conditions of use.

As indicated, light pulses generated by scanning of the grating 62 by reflecting surface 56 are transformed by the photomultiplier 66 into electrical pulses. These pulses, after suitable amplification and/or shaping, are then counted in conventional electronic counting circuits, the count of pulses representing the width of the material being gauged. The resolution obtainable, using apparatus of the type illustrated, is given by the formula $R=S_1/NS_2$ where R is the resolution, $S_1$ and $S_2$ the distance as shown in FIGURE 4, and N the number of lines per inch provided in grating 60. For example, to obtain one half mil resolution requires a grating frequency of only 1000 per inch using an $S_1:S_2$ ratio of 2 to 1.

A further refinement of the basic arrangement shown in FIGURE 3 appears to best advantage in FIGURE 2 and is directed to the avoidance of errors due to vertical movement of sheet 12 during measurement. Referring to FIGURE 4 it will be seen that any displacement ΔY in the vertical direction results in apparent elongation ΔX of the material being measured. Ideally this problem can be eliminated by locating the scanning ray at the end of its traverse normal to the edge of the material undergoing measurement. One arrangement for achieving this result is to split the scanning beam by means of prisms 26 and 28 mounted in outriggers 22 and 24 as seen in FIGURE 2.

In summary, in the device of the present invention radiation signals corresponding to edge positions of the dimension being measured are used, after suitable amplification and differentiation, to actuate and deactuate an electronic counter. During the counter's period of actuation it is fed a train of electrical pulses generated by the scanning device, the number of which is in direct proportion to the linear distance scanned.

By the unique structural arrangement illustrated there is provided a dimensional gauge whose accuracy is unaffected by vertical movement of the object during measurement and which is self-correcting for conditions of parallax.

In its preferred form parallax correction is provided by what, in effect, is a scanning head composed of a single reflector one face of which is used to generate the scanning ray employed for edge detection and the other face of which is used for pulse generation. The physical interrelationship of the elements performing these functions insures the fixed proportionality necessary to eliminate parallax error.

While a preferred form of the present invention has been depicted and described, it will be understood by those skilled in the art that the invention is susceptible of changes and modifications without departing from the essential concepts thereof, and that such changes and modifications are contemplated as come within the terms of the appended claims.

I claim:

1. In apparatus for measuring linear distances, the combination comprising: electro-optical scanning means for detecting radiation discontinuities and for generating a signal in response to the occurrence of such a discontinuity; electro-optical means for generating a plurality of discrete signals throughout a scanning traverse of said electro-optical scanning means; means for translating said signals into a form indicative of a dimension of an object being scanned in a time interval between detected radiation discontinuities; and means insuring a fixed proportionality between the linear distance scanned and the number of signals generated during such scanning traverse.

2. In a measuring device of the type described, the combination comprising: photoelectric means; radiation-reflective scanning means positioned to reflect radiation emanating from a surface a dimension of which is to be measured, and areas contiguous thereto, onto said photoelectric means; means associated with said reflective means for generating a train of electrical pulses the number of which is in fixed proportion to a linear distance scanned; and means operable by said photoelectric means on transmission thereby of signals produced by radiation discontinuities corresponding to end positions of the dimension being scanned to translate said pulses into a form indicative of the magnitude of said dimension.

3. A device for measuring the width of a moving sheet of material, comprising: photoconductive means; a rotatable reflector for optically scanning said sheet of material in a direction transverse its path of travel and positioned to reflect radiation emanating from said sheet onto said photoconductive means; means associated with said reflector for generating, in the time period between detected radiation discontinuities, a train of discrete electrical pulses the number of which is in fixed proportion to a linear distance scanned; and means operable by said photoconductive means during said interval to translate said pulses into a form indicative of the width of said sheet.

4. The combination set forth in claim 3, wherein said means for generating a train of discrete electrical pulses includes reflecting means rotatable in synchronism with said reflector, and a back-lighted grating scannable by said reflecting means.

5. In apparatus for measuring the dimensions of an object, the combination comprising: first photosensitive means; scanning means including radiation-reflective means positioned to intercept, during a scanning traverse, radiation emanating from said object and its immediate surroundings and to reflect same onto said first photosensitive means; means mechanically linked to said scanning means for generating a train of radiation pulses throughout a scanning traverse, the number of which is in fixed proportion to a linear distance scanned; second photosensitive means for converting said radiation pulses into discrete electrical signals; and electronic counting means in electrical connection with said first and second photosensitive means and activatable by said first photosensitive means, on detection of a radiation discontinuity, to translate pulses received from said second photosensitive means into a form indicative of the linear dimension being scanned and deactivatable by said first photosensitive means on detection of a second radiation discontinuity.

6. In apparatus for measuring the dimensions of an object, the combination comprising: first photosensitive means; scanning means including radiation-reflective means positioned to intercept, during a scanning traverse, radiation emanating from said object and its immediate surroundings and to reflect same onto said first photosensitive means; means mechanically linked to said scanning means for generating a train of radiation pulses throughout a linear measurement scan, the number of which is in fixed proportion to a linear distance scanned; second photosensitive means for converting said radiation pulses into discrete electrical signals; and electronic counting means in electrical connection with said first and second photosensitive means and controllable by said first photosensitive means in the time interval between radiation discontinuities to translate pulses received from said second photosensitive means into a form indicative of the linear dimension scanned.

7. The combination set forth in claim 6 wherein said radiation-reflective means comprises a 45° prism, and wherein said means mechanically linked to said scanning means comprises a second 45° prism positioned with its hypotenuse in abutting relation with that of said first mentioned prism.

8. In apparatus for measuring the dimensions of an object, the combination comprising: first electronic means including a radiation detector; scanning means including radiation-reflective means positioned optically to traverse said object and to reflect radiation emanating from said object and its surroundings onto said radiation detector; means connected to said scanning means for generating a train of radiation pulses throughout a measurement traverse, the number of which pulses is in fixed proportion to a linear distance scanned; second electronic means for converting said radiation pulses into discrete electrical signals; and electronic counting means in electrical connection with said first and second electronic means, and activatable by said first electronic means to translate said signals in a time interval between detected radiation discontinuities into a form indicative of the linear dimension traversed by said scanning means.

9. The combination set forth in claim 8 wherein said radiation-reflective means comprises one face of a two sided reflector and wherein said means connected to said scanning means for generating a train of radiation pulses includes the opposite face of said reflector.

References Cited

UNITED STATES PATENTS

| | | | |
|---|---|---|---|
| 2,674,915 | 4/1954 | Anderson | 250—219 |
| 2,928,952 | 3/1960 | Bednarz | 88—14 |
| 3,061,731 | 10/1962 | Thier et al. | 250—236 X |
| 3,068,741 | 12/1962 | Werner | 88—14 |

FOREIGN PATENTS 251,090   4/1964   Australia.

WALTER STOLWEIN, *Primary Examiner.*